United States Patent
Tanji et al.

(10) Patent No.: US 11,743,164 B2
(45) Date of Patent: Aug. 29, 2023

(54) QUALITY MEASURING DEVICE, QUALITY MEASURING METHOD, AND QUALITY MEASURING PROGRAM

(71) Applicant: Nippon Telegraph and Telephone Corporation, Tokyo (JP)

(72) Inventors: Naoyuki Tanji, Musashino (JP); Atsushi Takada, Musashino (JP); Kyoko Yamagoe, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 22 days.

(21) Appl. No.: 17/433,371

(22) PCT Filed: Feb. 12, 2020

(86) PCT No.: PCT/JP2020/005218
§ 371 (c)(1),
(2) Date: Aug. 24, 2021

(87) PCT Pub. No.: WO2020/175130
PCT Pub. Date: Sep. 3, 2020

(65) Prior Publication Data
US 2022/0173989 A1 Jun. 2, 2022

(30) Foreign Application Priority Data
Feb. 26, 2019 (JP) ................... 2019-032849

(51) Int. Cl.
*H04L 43/55* (2022.01)
*H04L 41/14* (2022.01)
(Continued)

(52) U.S. Cl.
CPC ............ *H04L 43/55* (2022.05); *H04L 41/145* (2013.01); *H04L 43/062* (2013.01);
(Continued)

(58) Field of Classification Search
CPC ..... H04L 43/55; H04L 41/145; H04L 43/062; H04L 43/0876; H04L 43/50; H04W 24/00
See application file for complete search history.

(56) References Cited

U.S. PATENT DOCUMENTS

| | | | |
|---|---|---|---|
| 9,946,619 B1 * | 4/2018 | McClintock | ........ G06F 11/1464 |
| 2016/0072730 A1 * | 3/2016 | Jubran | .................. H04L 41/14 709/224 |
| 2019/0173764 A1 * | 6/2019 | Di Martino | ........... H04L 41/122 |

OTHER PUBLICATIONS

Bradner et al., "Benchmarking Methodology for Network Interconnect Devices," Network Working Group Request for Comments: 2544, Mar. 1999, 31 pages.

(Continued)

*Primary Examiner* — Shirley X Zhang
(74) *Attorney, Agent, or Firm* — Fish & Richardson P.C.

(57) ABSTRACT

To reproduce and measure a network load that occurs suddenly. A quality measurement device 1 includes a load analysis unit 21 which analyzes a load of a measurement target network 2, a reference load acquisition unit 22 which acquires reference load data 14 including a load of a reference network 3, a test condition determination unit 23 which determines, based on a load at a reference point of the reference network 3, a load to be added to a measurement point of the measurement target network 2 corresponding to the reference point, and a test traffic generation unit 24 which gives traffic corresponding to the load that is determined to the measurement point.

3 Claims, 7 Drawing Sheets

(51) Int. Cl.
*H04L 43/0876* (2022.01)
*H04L 43/062* (2022.01)
*H04W 24/00* (2009.01)
*H04L 43/50* (2022.01)

(52) U.S. Cl.
CPC .......... *H04L 43/0876* (2013.01); *H04L 43/50* (2013.01); *H04W 24/00* (2013.01)

(56) References Cited

OTHER PUBLICATIONS

Hedayat et al., "A Two-Way Active Measurement Protocol (TWAMP)," Network Working Group Request for Comments: 5357, Oct. 2008, 26 pages.

* cited by examiner

| ACQUISITION METHOD | ACQUISITION INTERVAL | INFORMATION INPUT TO LOAD ANALYSIS UNIT |
|---|---|---|
| SNMP/MIB | 5 MINUTES | TRANSMITTING AND RECEIVING TRAFFIC AMOUNT/ NUMBER OF PACKET COUNT FOR EACH INTERFACE OF MEASUREMENT TARGET NODE |
| NetFlow | 1 MINUTE | TRAFFIC AMOUNT/NUMBER OF FLOWS FOR EACH OF TRANSMITTING AND RECEIVING IP ADDRESS, PROTOCOL TYPE, AND PORT NUMBER |
| PACKET CAPTURE | 15 MINUTES | pcap FILE |
| ..... | ..... | ..... |

11 TRAFFIC ACQUISITION CONDITION DATA

Fig. 3

12 LOAD ANALYSIS CONDITION DATA

| AGGREGATION GRANULARITY | AGGREGATION ITEMS | REQUIRED ACQUISITION METHOD |
|---|---|---|
| FOR EACH INTERFACE OF NW DEVICE | bps<br>pps | SNMP/MIB |
| FOR EACH IP ADDRESS | bps<br>pps<br>NUMBER OF FLOWS<br>NUMBER OF PORT NUMBER TYPES | NetFlow OR PACKET CAPTURE |
| FOR EACH PORT NUMBER | bps<br>pps<br>NUMBER OF FLOWS | NetFlow OR PACKET CAPTURE |
| ..... | ..... | ..... |

Fig. 4

16 TEST CONDITION DATA

| PACKET TYPE | TRANSMISSION DESTINATION | TRANSMISSION CONDITION (TIME/NUMBER OF TIMES/TRAFFIC AMOUNT) |
|---|---|---|
| PROTOCOL = TCP<br>TRANSMISSION DESTINATION PORT = 54321<br>TRANSMISSION SOURCE PORT = 80<br>FLOW RATE = 10 Mbps | 192.168.1.1 | 30 MINUTES<br>SINCE<br>2018.12.05 12:20 |
| SIZE = 1400 bytes<br>PROTOCOL = ICMP<br>TYPE = 8 (echo request) | 192.168.10.10 | 1000 TIMES<br>SINCE<br>2018.12.06 19:19 |
| PROTOCOL = TCP<br>TRANSMISSION DESTINATION PORT = 22<br>TRANSMISSION SOURCE PORT = 54321 | 10.10.10.10 | 50 MB<br>SINCE<br>2018.12.06 00:00 |
| ..... | ..... | ..... |

Fig. 5

(a)
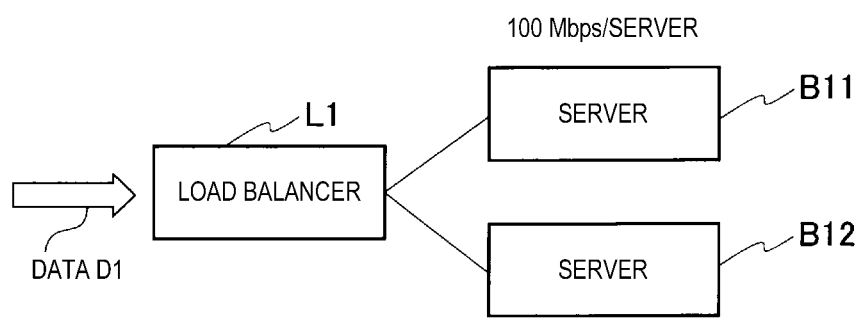
(b)
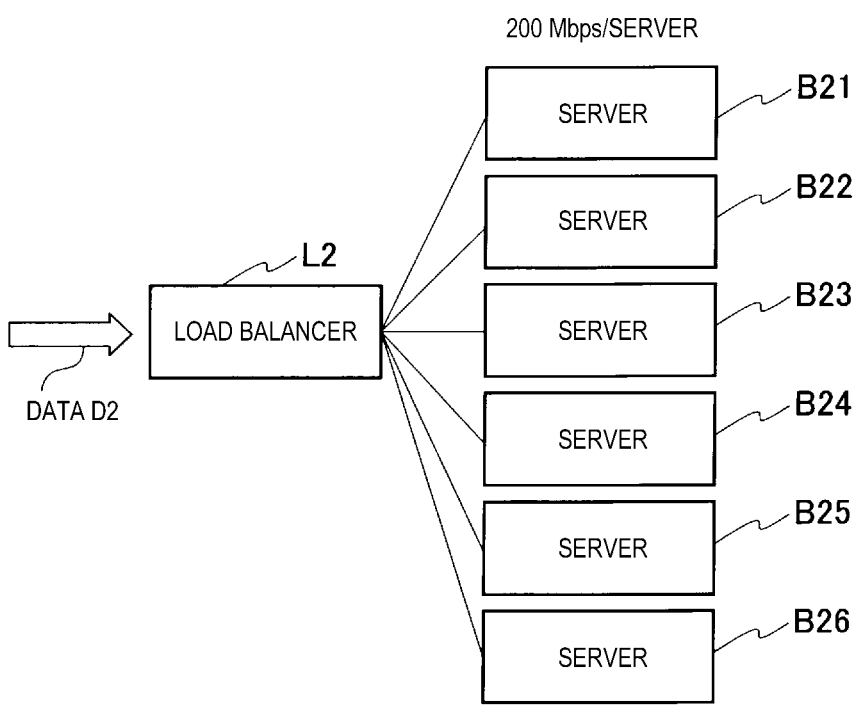
Fig. 7

QUALITY MEASURING DEVICE, QUALITY MEASURING METHOD, AND QUALITY MEASURING PROGRAM

CROSS-REFERENCE TO RELATED APPLICATIONS

This application is a National Stage application under 35 U.S.C. § 371 of International Application No. PCT/JP2020/005218, having an International Filing Date of Feb. 12, 2020, which claims priority to Japanese Application Serial No. 2019-032849, filed on Feb. 26, 2019. The disclosure of the prior application is considered part of the disclosure of this application, and is incorporated in its entirety into this application.

TECHNICAL FIELD

The present disclosure relates to a quality measurement device, a quality measurement method, and a quality measurement program that measure quality of a measurement target network.

BACKGROUND ART

In order to continuously provide high-quality network services, it is effective to regularly measure and monitor the quality of a network. Standards such as TWAMP and RFC 2544 are known network quality measurement methods (see Non Patent Literature 1 and Non Patent Literature 2). Based on these standards, a method of executing communication for measurement and measuring network quality has become widespread.

Because a network typically shares resources among a plurality of users, the measured quality of the network is affected by the load correlated with the usage status of each user, such as the presence or absence of large volume of communications. In designing network services, quality design that takes into account the effects of load is performed. Furthermore, quality-specific changes such as the presence or absence of quality changes due to a network load are monitored during the operation of network services. For example, quality characteristics may change due to the addition or renewal of devices in network services, changes in the tendency of user terminals, changes in mainstream services such as the transition from text data display to high-quality video distribution, and the like.

CITATION LIST

Non Patent Literature

Non Patent Literature 1: Network Working Group, "A Two-Way Active Measurement Protocol (TWAMP), [online], October 2008, [retrieved on Feb. 20, 2019], Internet <URL: https://tools.ietf.org/html/rfc5357>
Non Patent Literature 2: Network Working Group, "Benchmarking Methodology for Network Interconnect Devices" [online] March 1999, [Search on Feb. 20, 2019], Internet <URL: https://tools.ietf.org/html/rfc2544>

SUMMARY OF THE INVENTION

Technical Problem

However, in daily network operations, the load per user may be suddenly or extraordinarily larger than expected due to a large-scale software update or the like. In such a case, the observed value of quality per user may be lower than the design value and the satisfaction level of the user may fall. Because such a quality deterioration occurs suddenly, quality-specific monitoring may be difficult.

Thus, an object of the present disclosure is to provide a quality measurement device, a quality measurement method, and a quality measurement program that reproduce and measure a network load that occurs suddenly.

Means for Solving the Problem

In order to solve the above-described problems, a first characteristic of the present disclosure relates to a quality measurement device for measuring quality of a measurement target network. A quality measurement device according to the first characteristic of the present disclosure includes a load analysis unit configured to analyze a load of the measurement target network, a reference load acquisition unit configured to acquire reference load data including a load of a reference network, a test condition determination unit configured to determine, based on a load at a reference point of the reference network, a load to be added to a measurement point of the measurement target network corresponding to the reference point, and a test traffic generation unit configured to give traffic corresponding to the load that is determined to the measurement point.

Here, the test condition determination unit may refer to a change parameter calculated based on a difference in scale between the measurement target network and the reference network to determine a load to be added to the measurement point.

A second characteristic of the present disclosure relates to a quality measurement method of measuring quality of a measurement target network. The quality measurement method according to the second characteristic of the present disclosure includes analyzing, by a computer, a load of a measurement target network, acquiring, by the computer, reference load data including a load of a reference network, determining, by the computer, based on a load at a reference point of the reference network, a load to be added to a measurement point of the measurement target network corresponding to the reference point, and giving, by the computer, traffic corresponding to the load that is determined to the measurement point.

Here, determining the load to be added to the measurement point may include referring to a change parameter calculated based on a difference in scale between the measurement target network and the reference network to determine a load to be added to the measurement point.

A quality measurement program for causing a computer to operate as the quality measurement device according to first or second aspect.

A third characteristic of the present disclosure relates to a quality measurement program for causing a computer to operate as the quality measurement device according to the first characteristic of the present disclosure.

Effects of the Invention

According to the present disclosure, it is possible to provide a quality measurement device, a quality measurement method, and a quality measurement program that reproduce and measure a network load that occurs suddenly.

BRIEF DESCRIPTION OF DRAWINGS

FIG. 3 is a diagram illustrating a data structure of traffic acquisition condition data and an example of data.

FIG. 4 is a diagram illustrating a data structure of load analysis condition data and an example of data.

FIG. 5 is a diagram illustrating a data structure of test condition data and an example of data.

FIG. 7 is a diagram illustrating an example of a test condition determined by the test condition determination unit according to the embodiment of the present disclosure.

DESCRIPTION OF EMBODIMENTS

Next, an embodiment of the present disclosure will be described with reference to the drawings. In the description of the drawings below, the same or similar parts are denoted by the same or similar reference signs.

Quality Measurement System

Figure 1:
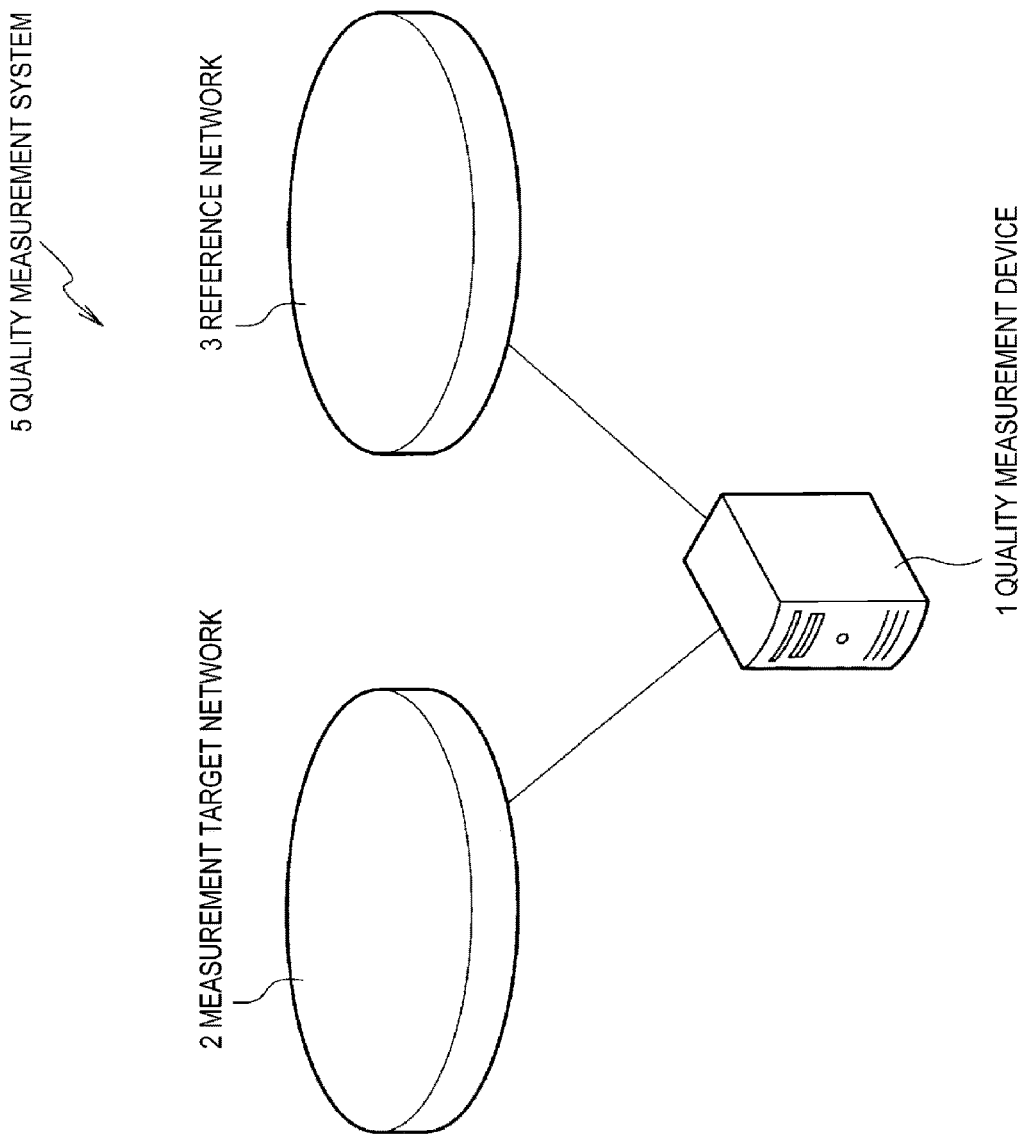
FIG. 1 is a diagram illustrating a system configuration of a quality measurement system according to an embodiment of the present disclosure.

Referring to FIG. 1, a quality measurement system 5 in which a quality measurement device 1 according to the embodiment of the present disclosure is used will be described.

The quality measurement system 5 includes the quality measurement device 1, a measurement target network 2, and a reference network 3. The measurement target network 2 is a network of which the quality is measured by the quality measurement device 1. The reference network 3 is a network to be referred to when a load given to the measurement target network 2 is calculated.

The quality measurement device 1 is connected to the measurement target network 2 and measures the quality of the measurement target network 2. In the embodiment of the present disclosure, a case in which the quality measurement device 1 is connected to the reference network 3 will be described. The quality measurement device 1 is required to be able to acquire load data of the reference network 3 even when the quality measurement device 1 is not connected to the reference network 3. The load acquired from the reference network 3 is a load of the network when a huge amount of traffic suddenly occurs.

The quality measurement device 1 adds test traffic imitating a sudden network load to the measurement target network 2 in addition to normal traffic to measure the quality of the measurement target network 2. Thus, the measurement target network 2 can be designed to guarantee appropriate quality even when a high load is suddenly applied to the measurement target network 2.

In the embodiment of the present disclosure, a case in which the reference network 3 is different from the measurement target network 2 is described, but the reference network 3 may be the same as the measurement target network 2. For example, when the information on the sudden traffic generated in the measurement target network 2 can be acquired, the quality measurement device 1 may generate test traffic based on the load of the sudden traffic generated in the measurement target network 2.

Quality Measurement Device

Figure 2:
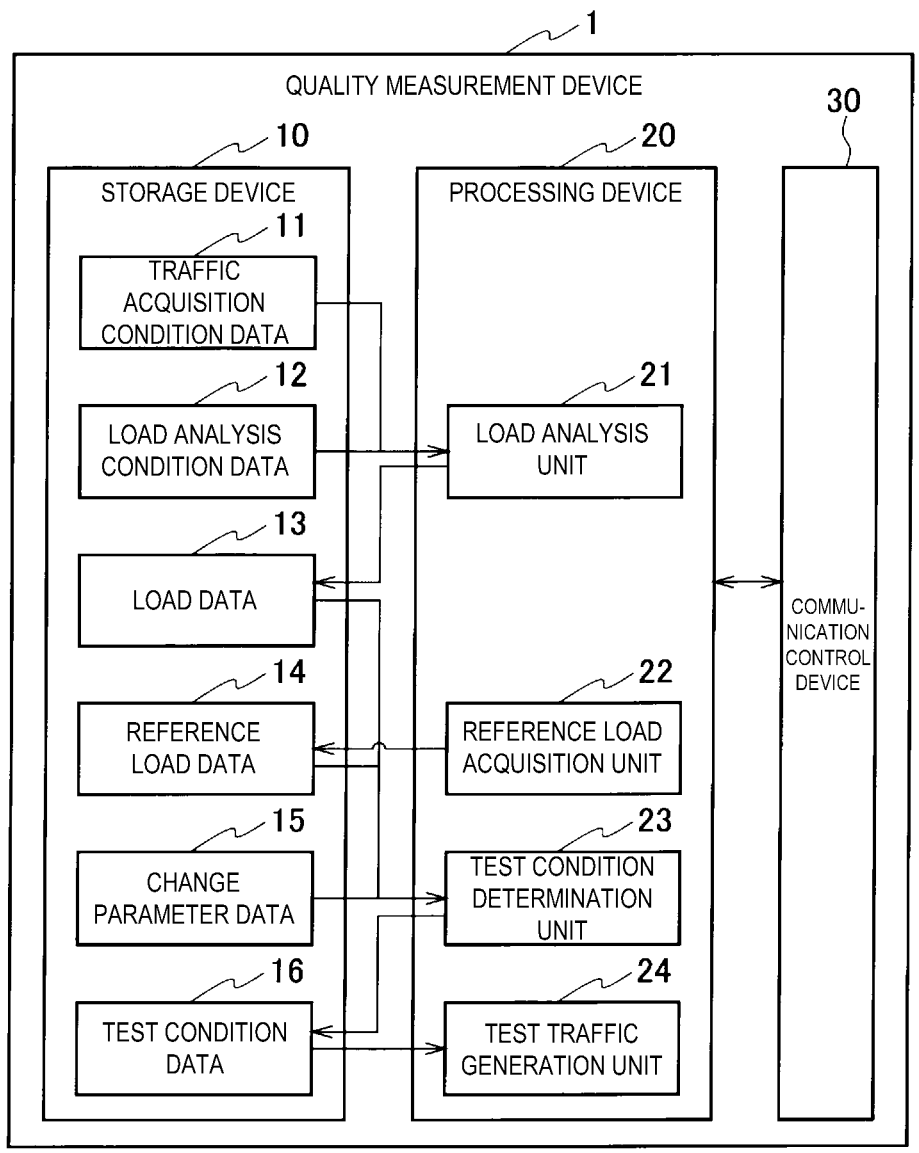
FIG. 2 is a diagram illustrating a hardware configuration and a function block of a quality measurement device according to the embodiment of the present disclosure.

Referring to FIG. 2, the quality measurement device 1 according to the embodiment of the present disclosure will be described. The quality measurement device 1 includes a storage device 10, a processing device 20, and a communication control device 30. The quality measurement device 1 may be a single computer in which the storage device 10, the processing device 20, and the communication control device 30 are incorporated or may be a virtual computer formed by a plurality of pieces of hardware. When such a computer executes a quality measurement program, the functions illustrated in FIG. 2 and quality measurement methods are implemented.

The storage device 10 is a read only memory (ROM), a random access memory (RAM), a hard disk, or the like and stores various data such as input data, output data, and intermediate data for executing processing in the processing device 20. The processing device 20 is a central processing unit (CPU) and reads or writes the data stored in the storage device 10 or inputs or outputs the data to or from the communication control device 30 to execute the processing in the quality measurement device 1. The communication control device 30 is an interface for allowing the quality measurement device 1 to be connected to the measurement target network 2 and the reference network 3 in a communicable state.

The storage device 10 stores a quality measurement program and stores traffic acquisition condition data 11, load analysis condition data 12, load data 13, reference load data 14, change parameter data 15, and test condition data 16.

The traffic acquisition condition data 11 is data on conditions when the load analysis unit 21 acquires traffic to analyze the load of the measurement target network 2. For example, as illustrated in FIG. 3, the traffic acquisition condition data 11 is data in which the acquisition method, the acquisition interval, and the information to be input to the load analysis unit 21 are associated with each other. The load analysis unit 21 acquires traffic from the measurement target network 2 according to any acquisition condition defined in the traffic acquisition condition data 11.

The load analysis condition data 12 is data which is referred to when the load analysis unit 21 analyzes the acquired traffic. For example, as illustrated in FIG. 4, the load analysis condition data 12 is data in which the aggregation granularity serving as the measurement point and the items to be aggregated are associated with each other. The load analysis unit 21 analyzes the acquired traffic according to any of the analysis conditions defined in the load analysis condition data 12. When the analysis condition is determined depending on the acquisition condition (acquisition method), the acquisition method may be associated with the analysis condition in the load analysis condition data 12. For example, when the acquisition method is SNMP/MIB, the aggregation granularity is for each interface of the network device.

The load data 13 is analysis result data of the measurement target network 2 by the load analysis unit 21. The load data 13 is data in which items to be aggregated are associated with each aggregation granularity defined by the load analysis condition data.

The reference load data 14 is analysis result data of the reference network 3. The reference load data 14 includes similar items for similar nodes to be able to compare with the load data 13.

The change parameter data 15 is a parameter calculated based on a difference in scale between the measurement target network 2 and the reference network 3. In the embodiment of the present disclosure, the change parameter may be calculated in advance or may be input by an operator or the like. Because there is a difference in scale such as the number of users between the measurement target network 2 and the reference network 3, it may not be possible to simply compare them with each other. The change parameter is used to convert the load at the reference point of the reference network 3 into the load at the measurement point of the measurement target network 2. The change parameter is, for example, the ratio of the number of users of the measurement target network 2 to the number of users of the reference network 3.

The test condition data 16 is data indicating the generation conditions of the test traffic by the test traffic generation unit 24. For example, as illustrated in FIG. 5, the test condition data 16 is data in which a packet type, a transmission destination, and a transmission condition are associated with each other. The transmission condition includes the transmission time, the number of times of transmission, or the traffic amount together with the transmission start time. The test condition data 16 is calculated by the test condition determination unit 23.

The processing device 20 includes a load analysis unit 21, a reference load acquisition unit 22, a test condition determination unit 23, and a test traffic generation unit 24.

The load analysis unit 21 refers to the traffic acquisition condition data 11 and the load analysis condition data 12 to analyze the load of the measurement target network 2.

First, the load analysis unit 21 acquires the load at the measurement point of the measurement target network 2 according to any of the acquisition conditions set in the traffic acquisition condition data 11 and the analysis conditions corresponding to the acquisition conditions of the load analysis condition data 12. The measurement point is, for example, a load balancer that distributes traffic to servers that are responsible for processing in the measurement target network 2.

For example, from the load balancer, the load analysis unit 21 acquires the transmitted and received traffic amount and the number of packet count every 5 minutes and for each interface by simple network management protocol/management information base (SNMP/MIB). The load analysis unit 21 aggregates each amount of bits per second/packets per second (bps/pps) for each interface as an analysis condition corresponding to SNMP/MIB. The load analysis unit 21 outputs the load data 13 in which each amount of bps/pps is associated with each interface.

The reference load acquisition unit 22 acquires the reference load data 14 which is a load of the reference network 3. The reference load acquisition unit 22 acquires a load for the reference point of the reference network 3 according to the acquisition condition and the analysis condition referred to by the load analysis unit 21. The reference point of the reference network 3 corresponds to the measurement point of the measurement target network 2. For example, when the measurement point of the measurement target network 2 is the load balancer, the reference point of the reference network 3 is also the load balancer. The load balancer at the measurement point of the measurement target network 2 distributes the traffic to the servers which are responsible for the processing in the measurement target network 2 and the load balancer of the reference point of the reference network 3 distributes the traffic to the servers which are responsible for the processing in the reference network 3.

The test condition determination unit 23 determines a load to be added to the measurement point of the measurement target network 2 corresponding to the reference point based on the load at the reference point in the reference network 3. The test condition determination unit 23 subtracts the load already applied to the measurement point from the load at the reference point of the reference network 3 to calculate a load to be added to the measurement point and sets the load to be added to the measurement point to the test condition data 16. As illustrated in FIG. 5, the test condition determination unit 23 sets the test condition data 16 in association with the type of packet to be generated, the transmission destination (measurement point), and the transmission condition.

The test condition determination unit 23 refers to the load at the reference point of the reference network 3 to calculate a difference from the load at the measurement point of the measurement target network 2. The traffic corresponding to the calculated load can be additionally generated in the measurement target network 2 by the test traffic generation unit 24.

For example, when the number of users of the measurement target network 2 is smaller than the number of users of the reference network 3, a large load that cannot occur in the measurement target network 2 may be applied to the measurement point if a load similar to that of the reference point occurs at the measurement point. In contrast, when the number of users of the measurement target network 2 is larger than the number of users of the reference network 3, a sudden load occurring in the measurement target network 2 that should be measured may not be reproduced even if a load similar to that of the reference point occurs at the measurement point.

Here, the test condition determination unit 23 may refer to the change parameter calculated based on a difference in scale between the measurement target network 2 and the reference network 3 to determine a load to be added to the measurement point. Thus, an appropriate test condition can be determined in consideration of the scale of the measurement target network 2. The test condition determination unit 23 multiplies the load at the reference point of the reference network 3 by the change parameter to calculate a load at the measurement point of the measurement target network 2. The test condition determination unit 23 subtracts the load already applied to the measurement point from the calculated load to calculate a load to be added to the measurement point.

Figure 6:
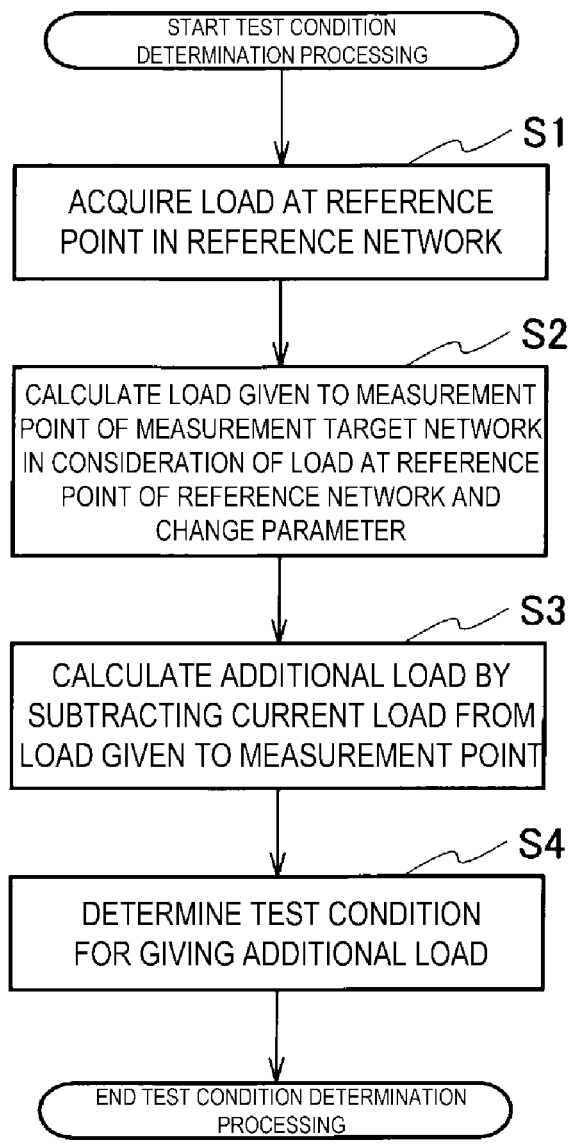
FIG. 6 is a flowchart illustrating test condition determination processing by a test condition determination unit according to the embodiment of the present disclosure.

Referring to FIG. 6, test condition determination processing by the test condition determination unit 23 according to the embodiment of the present disclosure will be described.

First, in step S1, the test condition determination unit 23 refers to the reference load data 14 to acquire the load at the reference point of the reference network 3.

In step S2, the test condition determination unit 23 calculates a load to be given to the measurement point of the measurement target network 2 from the load at the reference point of the reference network 3 and the change parameter of the change parameter data 15. The test condition determination unit 23 multiplies the load at the reference point of the reference network 3 by the change parameter to calculate a load to be given to the measurement point of the measurement target network 2.

In step S3, the test condition determination unit 23 subtracts the load already given to the measurement point at the current time from the load to be given to the measurement point that is calculated in step S2 to calculate a load to be added to the measurement point. In step S4, the test condition determination unit 23 determines a test condition for giving the additional load calculated in step S3 to generate the test condition data 16.

Referring to FIG. 7, an example of the additional load determined by the test condition determination unit 23 will be described. FIG. 7(*a*) illustrates a load balancer L1 which is the measurement point of the measurement target network 2 and its subordinate servers B11 and B12. FIG. 7(*b*)

illustrates a load balancer L2 which is the reference point of the reference network 3 and its subordinate servers B21 to B26.

The load balancer L1 which is the measurement point in the measurement target network 2 processes 200 Mbps data D1. In contrast, the load balancer L2 which is the measurement point in the reference network 3 processes 1200 Mbps data D2.

Here, when the change parameter is 1.0, a load of 1000 Mbps (1200 Mbps−200 Mbps) is added to the load balancer L1 of the measurement target network 2. Further, when the change parameter is 0.5, a load of 400 Mbps (1200 Mbps*0.5-200 Mbps) is added to the load balancer L1 of the measurement target network 2.

In the above-described example, a case in which the load balancer is the measurement point/reference point has been described, but the server may be the measurement point/reference point. In the case of the example illustrated in FIG. 7, two servers are operated in the measurement target network 2, whereas six servers are operating in the reference network 3, and the processing amount ratio differs depending on the number of servers. Here, when the servers are multiplexed, the load given to the entire server of the measurement target network 2 is calculated and then the load given to each server is calculated.

Here, when the change parameter is 1.0, a total load of 1000 Mbps (1200 Mbps−200 Mbps) is added to the two servers of the measurement target network 2 and hence a load of 500 Mbps is added to the server B11 which is the measurement point. Further, when the change parameter is 0.5, a total load of 400 Mbps (1200 Mbps*0.5−200 Mbps) is added to the two servers of the measurement target network 2 and hence a load of 200 Mbps is added to the server B11 which is the measurement point.

The test traffic generation unit 24 gives traffic corresponding to the determined load to the measurement point. The test traffic generation unit 24 transmits a packet specified by the packet type to the transmission destination (measurement point) according to the transmission condition in accordance with the test condition data 16. Thus, because the sudden load acquired from the reference network 3 can be given to the measurement point in addition to the normal load, the load analysis unit 21 can monitor the measurement target network 2 that receives the sudden load.

In this way, according to the quality measurement system 5 of the embodiment of the present disclosure, a network load that occurs suddenly can be given to the measurement target network 2 by referring to the load of the reference network 3. Further, the quality measurement system 5 can reproduce the network load that occurs suddenly and measure the measurement target network 2. Thus, the quality measurement system 5 can design the measurement target network 2 in consideration of the network that occurs suddenly.

OTHER EMBODIMENTS

Although the embodiment of the present disclosure has been described above, it should be understood that description and drawings that are parts of the present disclosure are not intended to limit the present disclosure. Various alternative embodiments, examples, and running techniques will become apparent from the present disclosure for those skilled in the art.

For example, the quality measurement device described in the embodiment of the present disclosure may be configured on one piece of hardware as illustrated in FIG. 2 or may be configured on a plurality of pieces of hardware according to the function and the number of processing operations. Further, the quality measurement device may be implemented on an existing communication system.

It goes without saying that the present disclosure includes various embodiments not described here. Thus, the technical scope of the present disclosure is defined only by the matters specifying the present disclosure according to the reasonable aspects from the above description.

REFERENCE SIGNS LIST

1 Quality measurement device
2 Measurement target network
3 Reference network
5 Quality measurement system
10 Storage device
11 Traffic acquisition condition data
12 Load analysis condition data
13 Load data
14 Reference load data
15 Change parameter data
16 Test condition data
20 Processing device
21 Load analysis unit
22 Reference load acquisition unit
23 Test condition determination unit
24 Test traffic generation unit

The invention claimed is:

1. A quality measurement device for measuring quality of a measurement target network, the quality measurement device comprising one or more processors configured to:
    acquire a first load amount of a first traffic applied at a measurement point of the measurement target network;
    acquire a second load amount of a second traffic applied at a reference point of a reference network, the reference point of the reference network corresponding to the measurement point of the measurement target network;
    determine a third load amount to be added to the measurement point of the measurement target network, wherein determining the third load amount comprises:
        determining a change parameter that is calculated as a ratio of the number of users in the measurement target network to the number of users in the reference network,
        multiplying the second load amount by the change parameter to obtain a scaled second load amount, and
        subtracting the first load amount from the scaled second load amount to obtain the third load amount; and
    generate a test traffic of the third load amount, and provide the test traffic of the third load amount to the measurement point of the measurement target network, wherein the test traffic is acquired from the reference network and given to the measurement target for measuring the quality of the measurement target network.

2. A quality measurement method of measuring quality of a measurement target network, the quality measurement method comprising:
    acquiring, by a computer, a first load amount of a first traffic applied at a measurement point of the measurement target network;
    acquiring, by the computer, a second load amount of a second traffic applied at a reference point of a reference network, the reference point of the reference network corresponding to the measurement point of the measurement target network;

determining, by the computer, a third load amount to be added to the measurement point of the measurement target network, wherein determining the third load amount comprises:

determining a change parameter that is calculated as a ratio of the number of users in the measurement target network to the number of users in the reference network, multiplying the second load amount by the change parameter to obtain a scaled second load amount, and subtracting the first load amount from the scaled second load amount to obtain the third load amount;

generating, by the computer, a test traffic of the third load amount; and providing, by the computer, the test traffic of the third load amount to the measurement point of the measurement target network, wherein the test traffic is acquired from the reference network and given to the measurement target for measuring the quality of the measurement target network.

3. A non-transitory computer readable medium storing one or more instructions for causing a computer to execute:

acquiring, by the computer, a first load amount of a first traffic applied at a measurement point of a measurement target network;

acquiring, by the computer, a second load amount of a second traffic applied at a reference point of a reference network, the reference point of the reference network corresponding to the measurement point of the measurement target network;

determining, by the computer, a third load amount to be added to the measurement point of the measurement target network, wherein determining the third load amount comprises:

determining a change parameter that is calculated as a ratio of the number of users in the measurement target network to the number of users in the reference network, multiplying the second load amount by the change parameter to obtain a scaled second load amount, and subtracting the first load amount from the scaled second load amount to obtain the third load amount;

generating, by the computer, a test traffic of the third load amount; and providing, by the computer, the test traffic of the third load amount to the measurement point of the measurement target network, wherein the test traffic is acquired from the reference network and given to the measurement target for measuring the quality of the measurement target network.

\* \* \* \* \*